United States Patent
Sugano et al.

(10) Patent No.: US 7,067,999 B2
(45) Date of Patent: Jun. 27, 2006

(54) ROTATION CONTROL DEVICE OF WORKING MACHINE

(75) Inventors: Naoki Sugano, Kobe (JP); Koji Inoue, Kobe (JP); Hideaki Yoshimatsu, Kobe (JP); Mamoru Uejima, Akashi (JP)

(73) Assignees: Kobelco Construction Machinery Co., Ltd., Hiroshima (JP); Kobe Steel, Ltd., Kobe (JP)

( * ) Notice: Subject to any disclaimer, the term of this patent is extended or adjusted under 35 U.S.C. 154(b) by 0 days.

(21) Appl. No.: 10/511,602

(22) PCT Filed: Apr. 28, 2003

(86) PCT No.: PCT/JP03/05420

§ 371 (c)(1),
(2), (4) Date: Nov. 3, 2004

(87) PCT Pub. No.: WO03/095751

PCT Pub. Date: Nov. 20, 2003

(65) Prior Publication Data

US 2005/0253542 A1    Nov. 17, 2005

(30) Foreign Application Priority Data

| May 9, 2002 | (JP) | ............................... 2002-134525 |
| Jul. 5, 2002 | (JP) | ............................... 2002-197309 |
| Jul. 5, 2002 | (JP) | ............................... 2002-197310 |

(51) Int. Cl.
 *H02K 7/10* (2006.01)
 *H02K 17/32* (2006.01)
 *H02K 23/68* (2006.01)
 *H02K 27/30* (2006.01)
 *H02P 3/00* (2006.01)

(52) U.S. Cl. ...................... 318/372; 318/461; 318/798; 318/799; 318/822; 318/823

(58) Field of Classification Search ................ 318/461, 318/798, 799, 822, 823
See application file for complete search history.

(56) References Cited

U.S. PATENT DOCUMENTS 6,199,307 B1 *  3/2001  Kagoshima et al. .......... 37/443
6,424,799 B1 *  7/2002  Gilmore ..................... 388/811

(Continued)

FOREIGN PATENT DOCUMENTS

| JP | 2529122 | 8/1996 |
| JP | 11-093210 | 4/1999 |
| JP | 11-336134 | 12/1999 |
| JP | 2000-204604 | 7/2000 |

*Primary Examiner*—Rina Duda
*Assistant Examiner*—Erick Glass
(74) *Attorney, Agent, or Firm*—Oblon, Spivak, McClelland, Maier & Neustadt, P.C.

(57) ABSTRACT

In a neutral range preset, there are set a zone for stopping and holding a rotating body only by a mechanical brake, a zone for holding the body only by performing position holding control, and a zone for simultaneously exerting both effects, i.e., the effect of the mechanical brake and the effect of the holding control. On-the-spot holding torque generated when the position holding control is performed is stored. The higher of the on-the-spot holding torque stored and accelerating torque according to an operation amount of the body at a rotation starting time is set as electric motor torque for acceleration. When performing a pressing work including pressing a bucket against an object for work, torque control is carried out according to the operation amount.

18 Claims, 13 Drawing Sheets

U.S. PATENT DOCUMENTS 6,700,341 B1 * 3/2004 Schaer et al. ............... 318/432
6,725,581 B1 * 4/2004 Naruse et al. ................ 37/348
6,836,614 B1 * 12/2004 Gilmore ..................... 388/811
6,851,207 B1 * 2/2005 Yoshimatsu .................. 37/348

* cited by examiner

ROTATION CONTROL DEVICE OF WORKING MACHINE

TECHNICAL FIELD

The present invention relates to a rotation control device for a working machine, such as an excavator, a crane, or the like, for rotatably driving a rotating body by an electric motor.

BACKGROUND OF THE INVENTION

Taking an excavator as an example, the prior art associated therewith will be described below.

The excavator generally employs a hydraulic motor driving system that is designed to use a hydraulic motor as a rotation driving source and to drive this hydraulic motor by discharge oil from a hydraulic pump.

In the case of employing this system, the discharge oil has its direction, pressure, and flow rate controlled by a control valve disposed between the hydraulic pump and the hydraulic motor, so that the operating direction, force, and speed of the hydraulic motor are controlled.

This system, however, has a drawback that a large amount of hydraulic energy has to be squeezed and disposed of by the control valve, resulting in huge loss of energy.

Thus, an electric motor driving system has been proposed that employs an electric motor as the rotation driving source (see Japanese Unexamined Patent Publication No. 11-93210, for example).

Conventionally, a large electric excavator for a climbing crane or for mining also employs the electric motor driving system in a rotation operation.

In such an electric motor rotation driving system, the direction and speed of rotation of a rotating body is controlled by adjusting the rotation direction and rotating speed of the electric motor, thereby significantly improving energy efficiency.

At the same time, when employing this system, a feedback speed control system is normally used to control the speed of the rotating body such that a deviation between an actually measured speed of the rotating body and a target speed thereof corresponding to an operation amount of an operation means is eliminated.

This system, however, has the following drawback concerning operational performance in rotation.

When the operation means is located in a neutral position and a commanded speed equals zero, braking torque is produced to stop a rotating body. Once a rotating speed of the electric motor becomes zero, torque (stopping and holding force) that causes the zero speed to be maintained will never be outputted, which results in the fact that braking and holding effect cannot be surely obtained.

For this reason, as a control system for stopping and holding the body is proposed another system that employs a mechanical brake mounted on a working machine with a hydraulic driving system.

The mechanical brake, however, is basically designed to actuate as a parking brake when the rotating body is in a stopped state. If this brake is used as a means for decelerating and stopping the electric motor in the electric motor rotation driving system without modification, there arises a problem that brake wearing becomes severe, while the jerky movement of the rotating body is caused due to shocks from an on/off operation of the brake when decelerating and accelerating, so that a smooth rotation stopping/accelerating effect cannot be obtained, thus degrading its operability.

On the other hand, in a normal operation of rotating an upper rotating body 2 above ground, a feedback speed control system enables control of rotating speed according to the operation amount of the operation means, which has no operational problem.

In contrast, when performing a pressing work which involves excavating earth by a bucket 6 and pressing its side against a wall surface g1 in a groove g to form the pressed wall surface g1, as shown in FIG. 14, the speed of rotation around a rotating shaft O becomes appropriate zero. Under the feedback speed control, a deviation between a target value of the rotating speed and an actually measured value thereof is increased. As a result, the feedback effect causes maximum rotation torque (electric motor torque) even when a slight amount of bucket operation is taken.

For this reason, when performing such a pressing work through the rotation, the torque control carried out by an operator becomes impossible, thereby impairing the machine operability.

Therefore, it is desirable that the feedback speed control system is employed, while imposing a limitation on torque depending on the operation amount.

When imposing the limitation on the torque as described above, the small operation amount of the operation means results in small torque of the electric motor. Therefore, when the rotating body starts to rotate toward an upper end side of an inclined ground or when the rotating body starts to rotate upwind under strong wind, the torque limitation as described above produces a shortage of accelerating torque. This causes the rotating body to rotate in a reverse direction, i.e. so-called "retrograde motion", disadvantageously leading to degradation in its security and operability.

Accordingly, the present invention is to solve the foregoing problems, and it is an object of the present invention to provide a rotation control device for a working machine with improved operability in rotation.

Concretely, it is a first object of the invention to securely hold the rotating body in a stopped state, to smoothly carry out a decelerating and stopping function of the rotation and an accelerating effect thereof without energy loss for stopping and holding the body, and to make it possible to use a known mechanical brake as it is.

It is a second object of the invention to prevent retrograde motion of the rotating body, which might be caused due to the shortage of torque, while imposing a limitation on the torque.

It is a third object of the invention to enable rotating torque control in the pressing work.

DISCLOSURE OF THE INVENTION

To solve the foregoing problems, the present invention employs the following arrangement.

According to one aspect of the present invention, there is provided a rotation control device for a working machine that comprises an electric motor for rotatably driving a rotating body, operation means for issuing a rotation command for rotation, control means for controlling the electric motor based on the rotation command issued from the operation means, rotating speed detecting means for detecting a rotating speed of the rotating body, and a mechanical brake for generating mechanical braking force, wherein the control means has a neutral range set by adding a predetermined width to an absolute neutral point serving as a basic point, the absolute neutral point corresponding to an operation amount of the operation means of zero, and in the neutral range, a mechanical brake zone is set on the absolute neutral point side, while a position holding control zone is set on a side opposite to the neutral point side, and wherein the control means is adapted to cause the mechanical brake to work in the mechanical brake zone of the neutral range, to perform position holding control in the position holding control zone, thereby stopping and holding the rotating body, and to perform speed control according to the operation amount of the operation means outside the neutral range.

According to another aspect of the present invention, there is provided a rotation control device for a working machine that comprises an electric motor for rotatably driving a rotating body, operation means for issuing a rotation command for rotation, control means for controlling the electric motor based on the rotation command issued from the operation means, and rotating speed detecting means for detecting a rotating speed of the rotating body, the control means performing speed control according to an operation amount of the operation means and imposing a limitation on a maximum value of accelerating torque according to the operation amount, wherein, when the operation means is positioned within a preset neutral range, the control means is adapted to perform position holding control of the rotating body, to store torque generated in the electric motor at this time as on-the-spot holding torque, and to set, in accelerating the rotation, the higher of the on-the-spot holding torque stored and the accelerating torque produced according to the operating amount of the operation means, as electric motor torque for accelerating.

According to a further aspect of the present invention, there is provided a rotation control device for a working machine that comprises an electric motor for rotatably driving a rotating body, operation means for issuing a rotation command for rotation, control means for controlling the electric motor based on the rotation command issued from the operation means, and rotating speed detecting means for detecting a rotating speed of the rotating body, the control means performing speed control according to an operation amount of the operation means, wherein, when performing a pressing work including pressing a part of the rotating body against an object of work, the control means performs torque control according to the operation amount of said operation means instead of the speed control.

DESCRIPTION OF PREFERRED EMBODIMENT OF THE INVENTION

Although some preferred embodiments of the present invention will be described hereinafter in detail by taking an excavator as an applied object, the invention is not limited thereto. For example, the invention can be widely applied to a rotation type work machine, such as a deep-hole digging machine consisting principally of an excavator, a crusher, a crane.

First Embodiment (See FIGS. 1 to 4)

Figure 1:
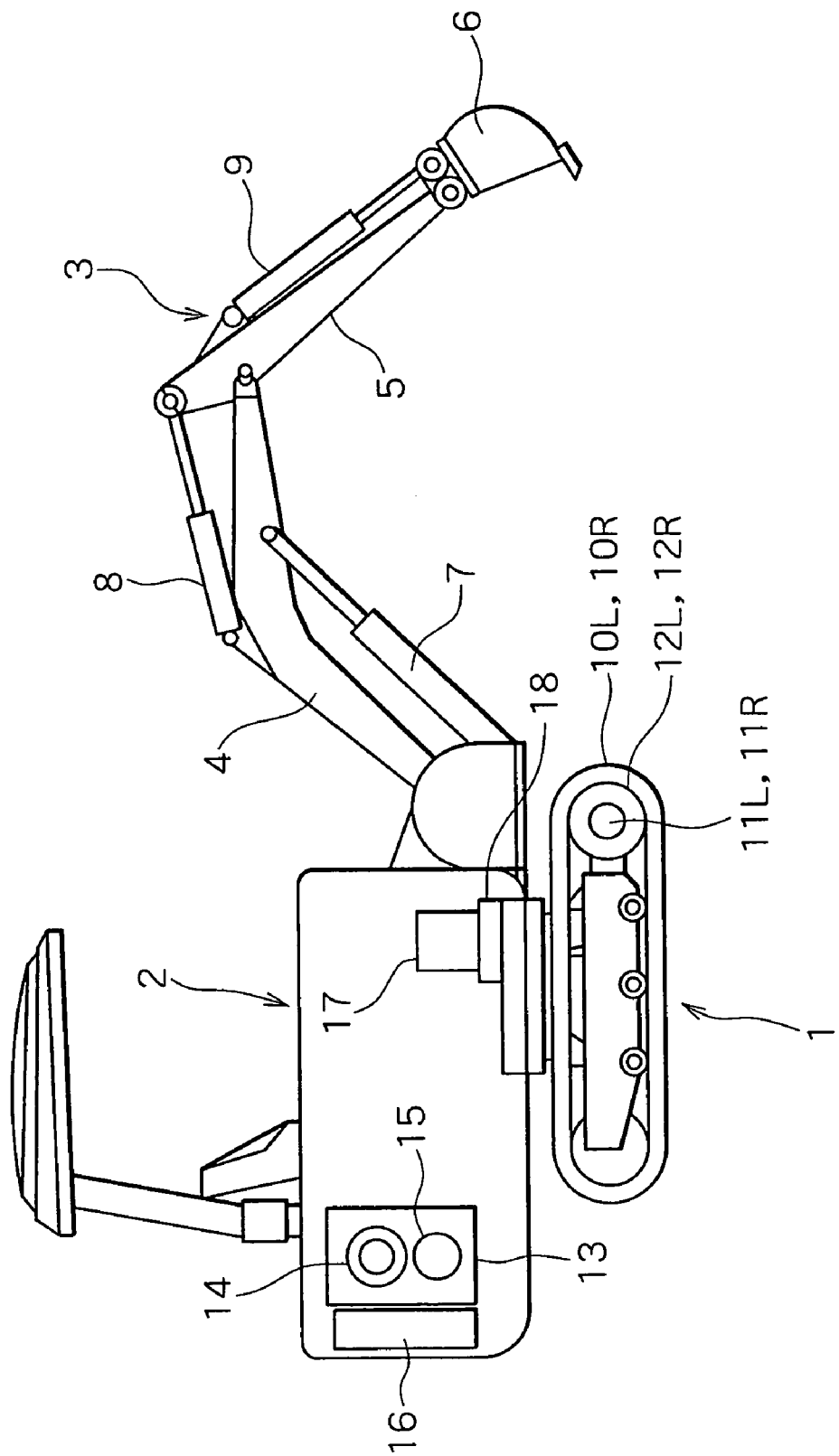
FIG. 1 is a side view of the entire configuration of an excavator on which a control device according to a first embodiment of the invention is mounted, and of the arrangement of devices therein.
Figure 2:
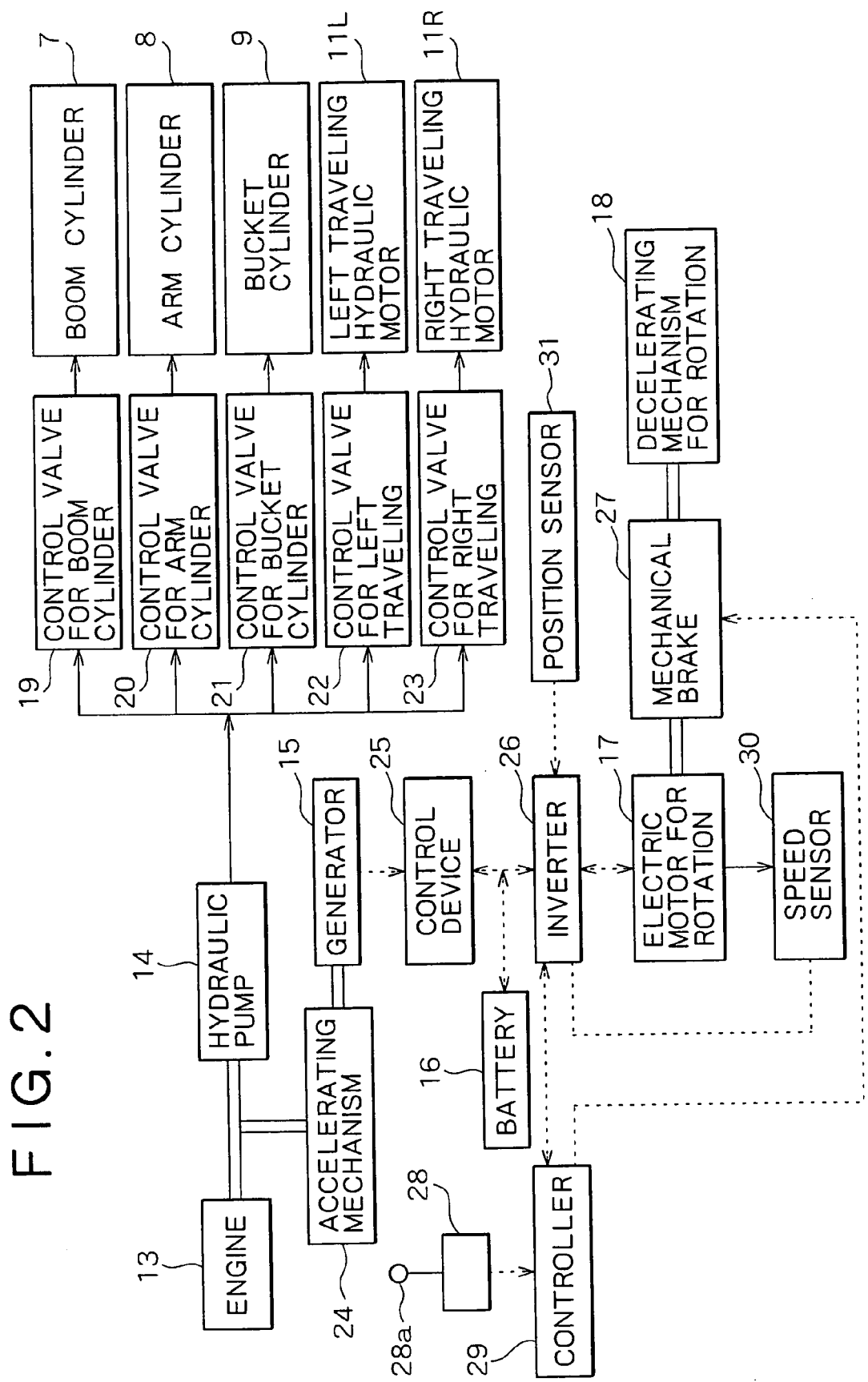
FIG. 2 is a block configuration diagram of the control device according to the first preferred embodiment.

FIG. 1 illustrates the schematic configuration of an entire excavator and the arrangement of devices therein, and FIG. 2 the block configuration of a drive and control system.

As shown in FIG. 1, on a crawler type lower traveling body 1 is rotatably mounted on an upper traveling body 2, which is equipped with an excavating attachment 3. The excavating attachment 3 includes a boom 4, an arm 5, a bucket 6, a boom cylinder 7, an arm cylinder 8, and a bucket cylinder 9.

The lower traveling body 1 includes left and right crawlers 10L and 10R, which are rotatably driven and traveled by traveling motors 11L and 11R and reduction gears 12L and 12R, respectively.

On the upper rotating body 2 are mounted an engine 13, a hydraulic pump 14, a generator 15, the pump and generator being driven by this engine 13, a battery 16, an electric motor for rotation 17, and a decelerating mechanism for rotation 18.

As shown in FIG. 2, discharge oil from the hydraulic pump 14 is supplied to the cylinders 7, 8 and 9 for the boom, arm and bucket, respectively, and to the left and right traveling motors 11L and 11R, via respective control valves 19, 20, 21, 22 and 23, by which an actuation or operation of the rotating body is controlled.

The generator 15 has driving force of the engine given thereto via an accelerating mechanism 24 to generate power. The power generated by the generator 15 is partially charged in the battery 16 via a control device 25 for controlling voltage and current, while the remaining power is given to the rotation electric motor 17 via an inverter 26, which is a part of control means.

A mechanical brake 27 serving as a negative brake for generating mechanical braking force is provided in the rotation electric motor 17. With this mechanical brake 27 released, rotational force of the rotation electric motor 17 is transmitted to the upper rotating body 2 via the rotation decelerating mechanism 18 to rotate the upper rotating body 2 leftward or rightward.

Reference numeral 28 denotes a rotation operating unit (for example, a potentiometer) serving as rotation operation means, which is operated by a lever 28a. A command signal responsive to the operation amount of the operating unit is inputted into a controller 29 which is a part of control means.

Furthermore, as sensors are provided a speed sensor 30 for detecting a rotating speed (rotating speed) of the rotation electric motor 17, and a position sensor (for example, encoder) 31 for detecting the position of the upper rotating body 2 with a rotation stopping place of the upper rotating body 2 set as zero point. Signals from both sensors 30 and 31 are inputted as control data into the controller 29 via the inverter 26.

Figure 3:
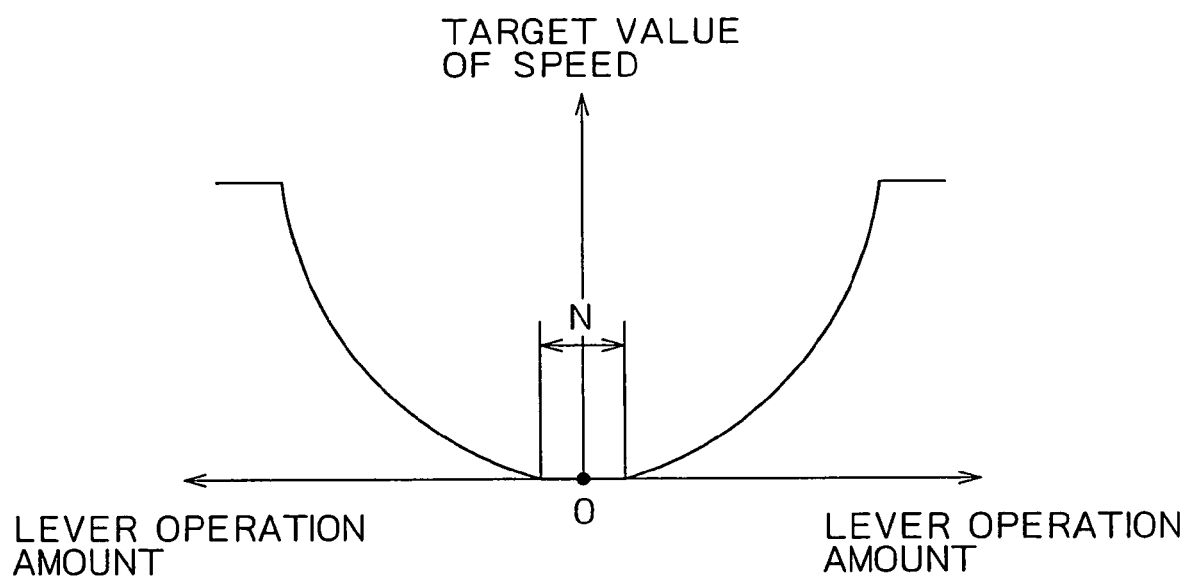
FIG. 3 is a diagram showing a lever operation amount-target value of speed characteristic of the device.

The controller 29 has a neutral range N previously set by adding predetermined widths (for example, a tilt angle of the operating lever 28a of 7.5 degree in each of the leftward and rightward directions) in leftward and rightward directions of rotation, respectively, to an absolute neutral point O serving as a basic point where an operation amount of the rotation operating unit 28 (hereinafter referred to as "lever operation amount") is zero, as shown in FIG. 3. When the lever is moved or pushed down beyond the neutral range N, speed control is carried out based on characteristics of the controller as shown in the figure. When the lever exists within the neutral range N, switching between control modes is performed according to the lever operating amount, as shown in FIG. 4.

That is, in the neutral range N, a mechanical brake zone B where the mechanical brake 27 exerts a braking effect is set within an inner side area thereof including the absolute neutral point O. In contrast, within the outer side area respective to the brake zone in the neutral range N is set a position holding control zone A where position holding control (in other words, servo lock control, that is, control for holding the rotating body 2 on the spot based on a signal from the position sensor 31) is carried out.

Both zones B and A, as shown in the figure, are set so as to be partially superimposed on each other in a simultaneous use zone C, where both functions of the mechanical brake and the position holding control are simultaneously carried out.

Figure 4:
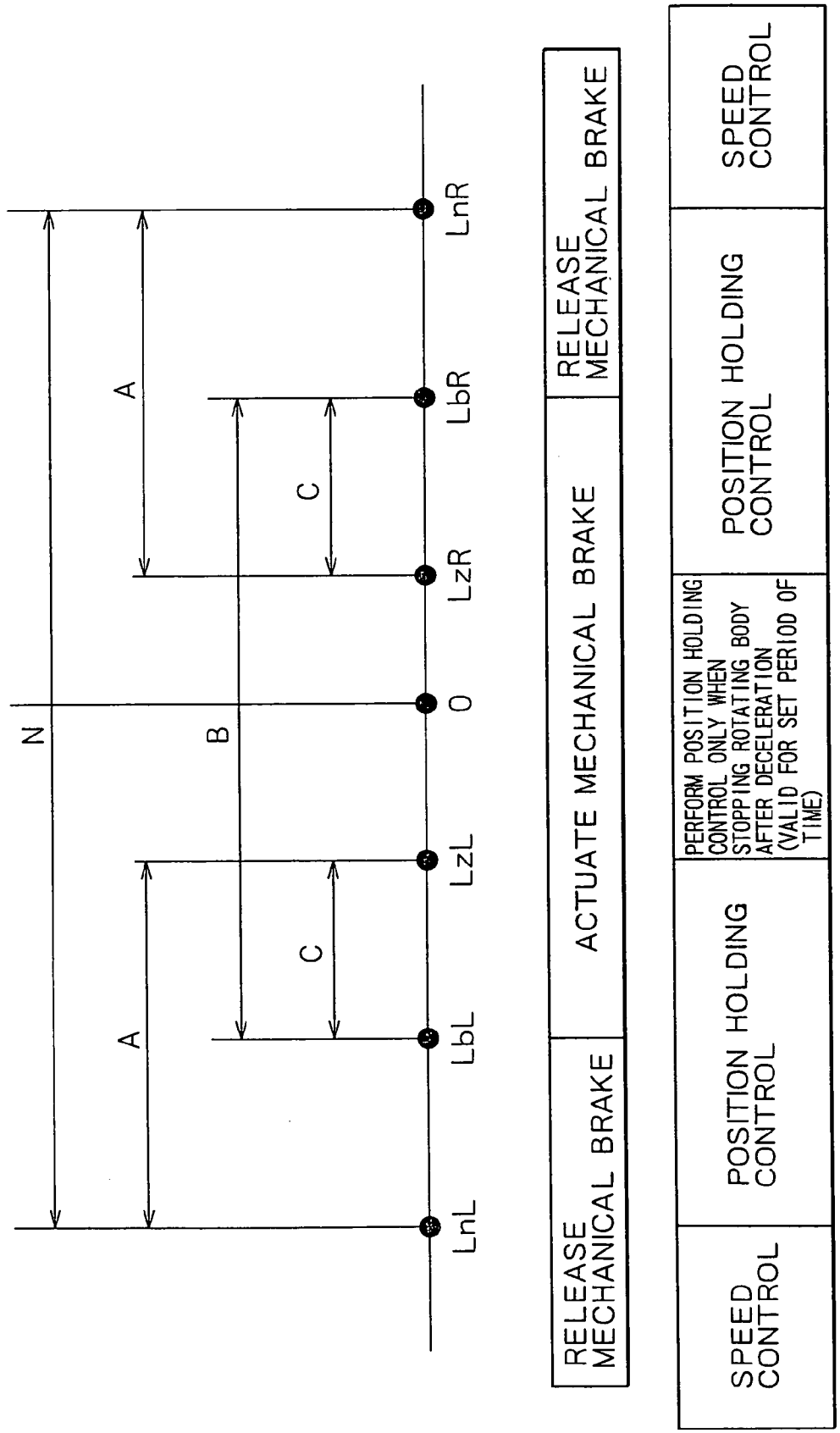
FIG. 4 is an explanatory diagram of detailed settings of a lever neutral range shown in the characteristic of FIG. 3.

In FIG. 4, reference symbols LnL and LnR denote neutral identifying points located on the extreme left and right of the neutral range N to define the range from both leftward and rightward directions of rotation. Reference symbols LbL and LbR denote mechanical brake identifying points located at a starting point and at an endpoint of the mechanical brake zone B. Reference symbols LzL and LzR denote position-holding-control identifying points located at a starting point and at an endpoint of the position holding control, respectively.

Based on the foregoing settings, the electric motor 17 for rotation will be controlled by the controller 29 and the inverter 26 in the following manner.

In Accelerating Rotation

When the lever operation amount reaches the mechanical brake zone B of FIG. 4, the mechanical brake 27 is actuated, so that its mechanical braking force only holds the rotating body 2 in a stopped state.

Then, when the lever operation amount reaches the simultaneous use zone C located at the boundary between the mechanical brake zone B and the position holding control zone A, the position holding control starts to work, whereby the mechanical braking force and the position holding control effect are exerted to stop and hold the rotating body 2.

After the lever operation amount exceeds the simultaneous use zone C, the mechanical brake 27 is released, and the only position holding control is performed, thereby to hold the rotating body 2 on the spot by its position holding control effect.

Furthermore, when the lever operation amount exceeds the position holding control zone A (neutral range N), the position holding control is turned off, and the rotation electric motor 17 is rotated with its speed being controlled, based on its characteristics as shown in FIG. 3, thereby performing acceleration of its rotation.

Thus, since the mechanical brake 27 works when the rotating body is in the stopped state, current to hold the body on the spot does not need to be constantly passed through the rotation electric motor 17, which current might be necessary in the case of stopping and holding the body only by the position holding control, thereby achieving energy savings.

Additionally, in a boundary of the speed control range (i.e. position holding control zone A), the position holding control enables elimination of shocks caused by turning the mechanical brake off when accelerating the rotation, which shock might occur in the case of stopping and holding the rotating body only by the mechanical brake 27, whereby a smooth accelerating effect can be obtained.

The simultaneous use zone C where both the position holding control effect and the mechanical brake 27 function are simultaneously exerted is previously set, thereby smoothly switching from the mechanical brake effect to the position holding control in accelerating, and also from the position holding control, which will be described below, to the mechanical brake effect in decelerating without shocks.

In Decelerating Rotation

When the operating lever 28a returns to the neutral range N from a rotation command position which is located outside the neutral range N and enters or is moved to the position holding control zone A, control for decelerating and stopping is started.

At this time, if a rotating speed actually detected by the speed sensor 30 falls below the position-holding-control starting speed previously set by the controller 29, the position holding control becomes effective, which generates braking torque in the electric motor 17.

Thus, since the position holding control is started with the rotating body being sufficiently decelerated, there is no risk that large braking torque could be exerted by the position holding control under a condition of insufficient deceleration to cause excessive current to pass through the rotation electric motor 17, thus leading to damage in the electric motor 17 and a circuit.

Then, when the lever operation amount reaches the mechanical brake zone B and the following conditions (1) and (2) are satisfied, the mechanical brake 27 is actuated to stop and hold the rotating body 2.

(1) The actually detected-rotating speed is equal to or less than a preset brake actuation speed.

(2) This condition, i.e. the condition in which the rotating speed is equal to or less than the brake actuation speed, continues for a set period of time.

Conversely, even when the lever operating amount reaches the mechanical brake zone B, if the above-mentioned conditions (1) and (2) are not satisfied, the mechanical brake 27 remains being released, causing the only position holding control to work, as shown in the center of a lower section of FIG. 4.

Thus, during decelerating the rotation, even if the lever operation amount reaches the mechanical brake zone B, the mechanical brake 27 is not actuated quickly. That is, the mechanical brake 27 is not actuated until the lever operation amount reaches the mechanical brake zone B and the condition in which the rotating speed is equal to or less than the preset speed (for example, speed of zero) continues for a while. With this arrangement, when the working machine repeatedly carries out works including rotation, stopping, and rotation in succession, for example, when the working machine excavates earth and sand at one spot to scoop up them and rotates so as to load the scooped ones into a dump truck, wearing of the mechanical brake 27 and occurrence of shocks due to the braking are prevented to obtain a smooth operation.

Figure 5:
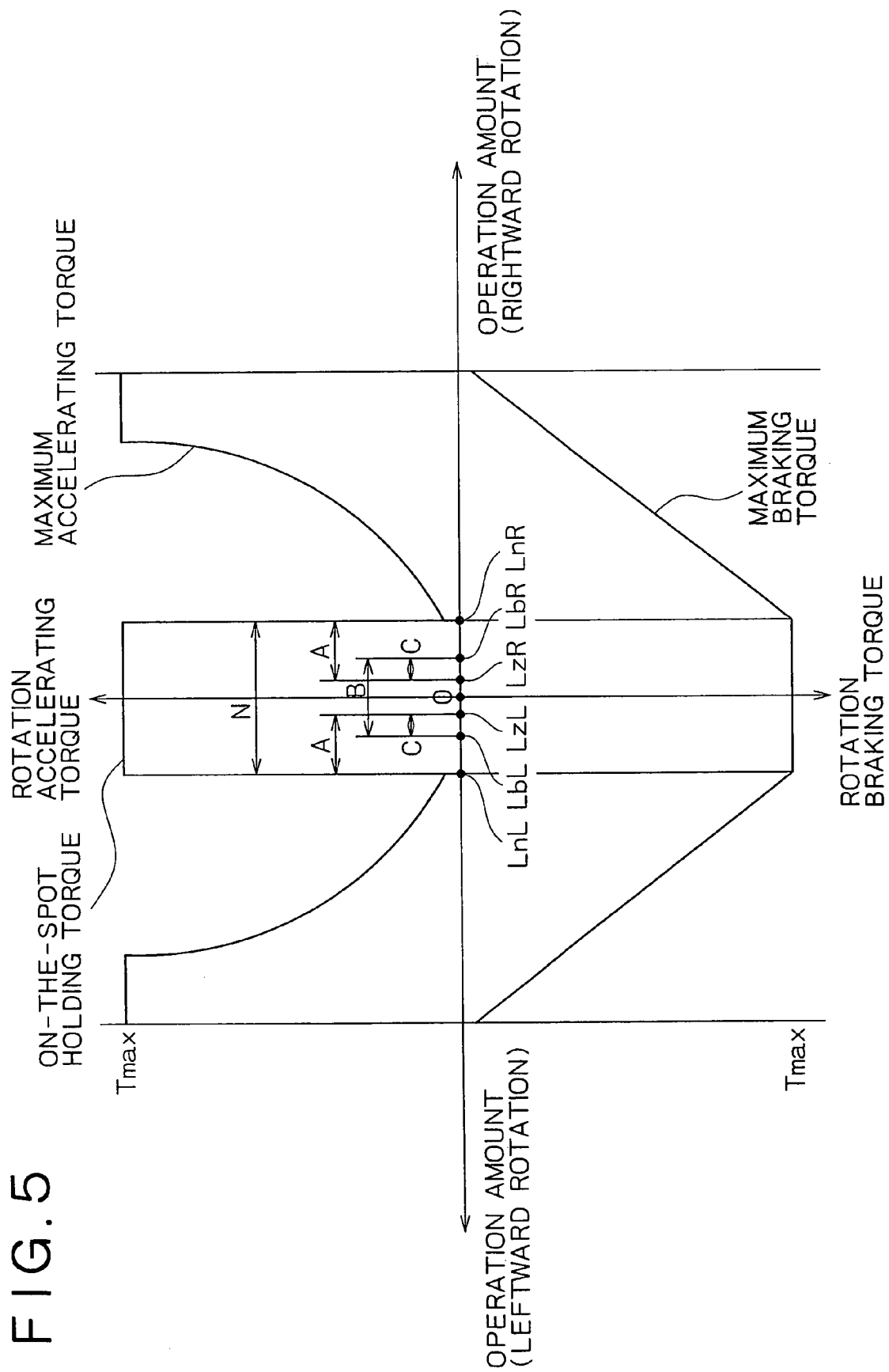
FIG. 5 shows a relationship among an operation amount, a rotation accelerating torque, and a rotation decelerating torque in a control device according to a second preferred embodiment of the invention.

Second Embodiment (See FIGS. 1, 2, and 5)

In the first embodiment, speed control is carried out depending on the amount of lever operation outside the neutral range N, while, in the second embodiment, speed control with torque limitations is carried out outside the neutral range N.

The configuration of the second embodiment is apparently the same as that of the first embodiment. Note that these embodiments differ from each other only in the contents of control performed by the controller 29 and the inverter 26. Thus, FIGS. 1 and 2 are cited, and in addition thereto FIG. 5 is used to explain the detailed contents of the control.

In Accelerating Rotation

Within the neutral range N, control of the second embodiment is the same as that of the first embodiment. When the lever operation amount exceeds the simultaneous use zone C, the mechanical brake 27 is released thereby to perform the only position holding control, an effect of which holds the rotating body 2 on the spot.

At this time, torque generated in the electric motor 17 (on-the-spot holding torque) is stored in the controller 29 via the inverter 26.

It should be noted that the on-the-spot holding torque may reach the maximum torque Tmax of the electric motor 17. FIG. 5 illustrates a case where the on-the-spot holding torque reaches a level of the maximum torque Tmax of the electric motor.

When the lever operation amount exceeds the position holding control zone A (neutral range N), accelerating torque (a maximum value of the accelerating torque) according to the lever operation amount shown in FIG. 5 is compared with the above-mentioned on-the-spot holding torque stored by the controller 29. The higher of the accelerating torque and the on-the-spot holding torque is set as electric motor torque for acceleration, which causes the rotating body 2 to be rotatably driven.

That is, feedback speed control with a torque limitation that regards the above-mentioned set torque as the maximum value causes the electric motor 17 to rotate.

Thus, in accelerating the rotation, as the electric motor torque for acceleration is set torque equal to or higher than the on-the-spot holding torque actually generated just before rotation starting time. This surely prevents the rotating body 2 from rotating in a reverse direction, i.e. the so-called "retrograde motion" which might occur due to a shortage of torque, especially when the rotating body starts to rotate toward an upper end side of an inclined ground or when the rotating body starts to rotate upwind under strong wind.

In Decelerating Rotation

When the operating lever 28a is returned from the rotation command position outside the neutral range N of FIG. 5 toward the neutral range N in decelerating, braking torque is calculated according to the lever operation amount based on braking torque characteristics of FIG. 5. The higher of the braking torque calculated and the on-the-spot holding torque stored in the controller 29 at the rotation starting time as described above is set as electric motor torque for deceleration, and then by this set torque, the rotating body 2 is decelerated.

Thus, even when the rotating body stops rotation on the inclined ground, the electric motor torque is constantly proportional to the gravity. There is no risk that the braking torque could be inferior to the gravity, causing the rotating body 2 to retrograde toward a lower end side.

Note that when the lever returns to the neutral range N of FIG. 5 and its operating amount reaches the position holding control zone A, the position holding control is started. Thereafter, when it reaches the mechanical brake zone B, the mechanical brake 27 is engaged or actuated to stop and hold the rotating body 2.

Starting of the position holding control restores the on-the-spot holding torque stored upon starting the rotation, to an initial value so as to prepare for update thereof to a next value to be stored.

Therefore, even if conditions including a tilt degree of the inclined ground, the weight of the rotating body, which depends on the presence or absence of loads, are varied every time the rotation is stopped, since the on-the-spot holding torque responsive to the condition is newly stored, the retrograde motion of the rotating body 2 is surely prevented when accelerating and decelerating the rotation.

Although, in the above-mentioned first and second embodiments, the so-called "parallel" type excavator is taken as an example in which electricity is used as power for rotation and oil hydraulics are used as power for other operations, the invention may also be applied to the so-called "series" type excavator that employs electric power as power sources for all actuators.

In the second embodiment, an example is taken in which both functions of the position holding control and the mechanical brake effect stops and holds the rotating body 2 within the neutral range N. When the speed control with torque limitations are performed outside the neutral range as described above, the invention may also be applied to the case where the rotating body 2 is stopped and held only by the position holding control.

Third Embodiment (See FIGS. 6 to 11)

Figure 6:
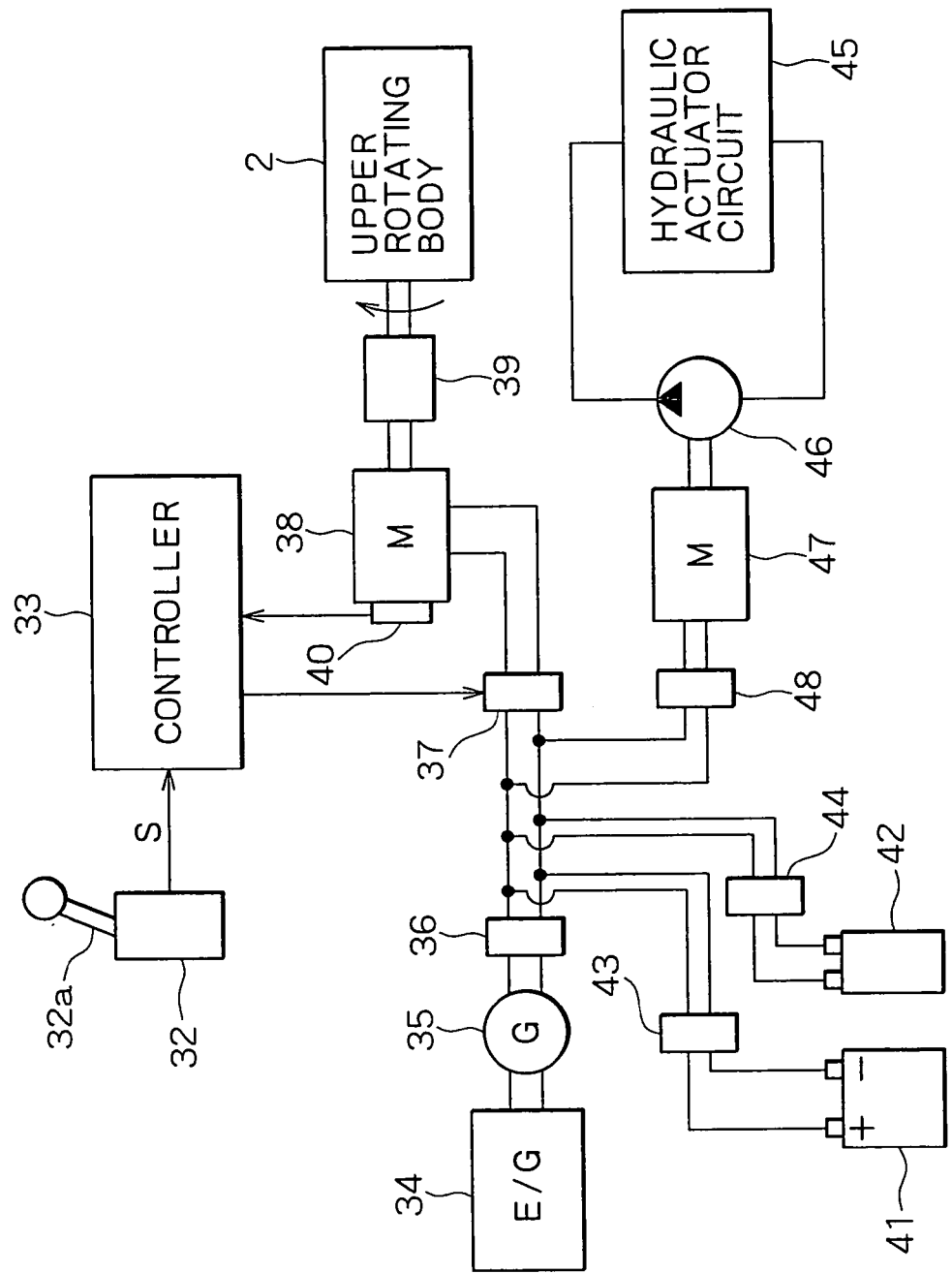
FIG. 6 is a block configuration diagram of a control device according to a third embodiment of the present invention.

FIG. 6 illustrates the entire configuration of such a rotation control device according to the third embodiment.

In the figure, reference numeral 32 denotes a rotation operating portion (which is identical to the rotation operating portion 28 of FIG. 2, for example, potentiometer) serving as the rotation operating means. This rotation operating portion 32 is operated by a lever 32a. A command signal responsive to the amount of its operation is inputted into the controller 33 serving as the control means.

Reference numeral 34 denotes an engine, and reference numeral 35 a generator 35 driven by this engine 34. Power from this generator 35 is transmitted to a rotation electric motor 38 via an inverter for the generator 36 and an inverter for the electric motor 37. Rotational force of the rotation electric motor 38 is transmitted to the upper rotating body 2 via a reduction gear 39, causing the rotating body 2 to rotate around a rotating axis.

Reference numeral 40 denotes an encoder serving as rotating speed detecting means for detecting the rotating speed of the rotation electric motor 38. The rotating speed of the electric motor detected by this encoder 40 is inputted into the controller 33 as an actually detected rotating speed.

It should be noted that not only the generator 35, but also a battery 41 and a capacitor 42 are provided as power sources of the rotation electric motor 38. Any appropriate one of these sources may be selected and used. Alternatively, these sources may be used in combination. Instead of such inner power sources, power may be supplied from an outer power source. Reference numeral 43 denotes an inverter for battery, and reference numeral 44 an inverter for capacitor.

A hydraulic pump 46 is provided as a hydraulic source for a hydraulic actuator circuit 45 for driving hydraulic actuators, such as cylinders 7, 8, and 9 of the excavating attachment 3. This hydraulic pump 46 is driven by an electric motor for the pump 47. Reference numeral 48 denotes an inverter for the pump electric motor.

Figure 7:
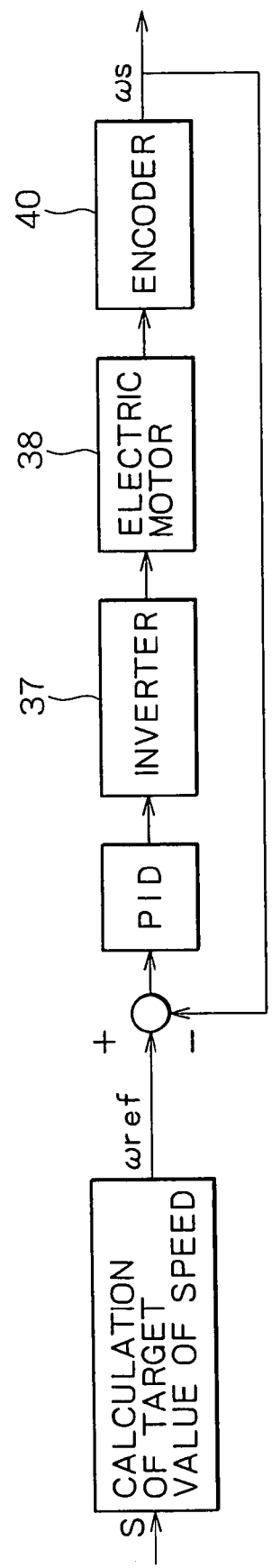
FIG. 7 is a flow diagram of speed feedback control carried out by the device.

The controller 33 controls speed of the rotation electric motor 38 by carrying out the speed PID feedback control shown in FIG. 7 when the body is freely rotated.

That is, the lever operation amount S is inputted into the controller 33 in the form of a signal indicative of the operation amount, whereby a target value of rotating speed ωref is calculated according to the lever operation amount S by this controller 33.

This target value ωref is compared with an actually value ωs of the rotating speed detected by the encoder 40 to obtain a deviation therebetween. By the PID feedback control, a signal that intends to render the deviation (ωref−ωs) zero is transmitted to the electric motor 38 via the inverter for the electric motor 37.

Figure 8:
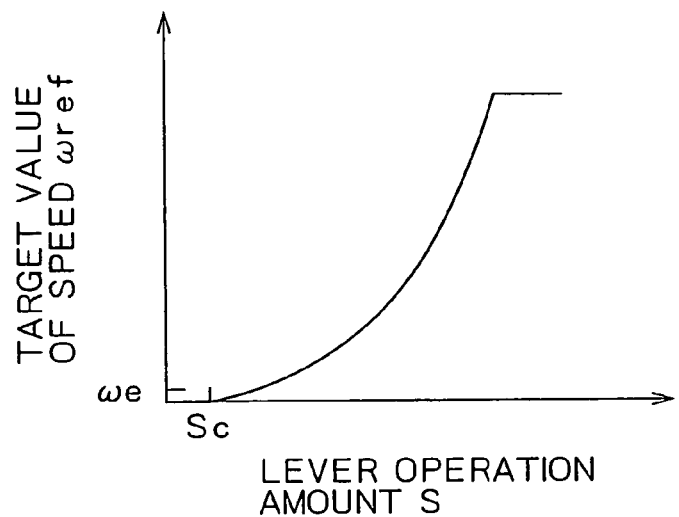
FIG. 8 shows a relationship between a lever operation amount and a target value of speed in the feedback control.

Thus, as shown in FIG. 8, the upper rotating body 2 rotates at a speed responsive to the lever operation amount S. In FIG. 8, Sc is an actuated position where the upper rotating body 2 starts to be actuated.

For convenience, although, in FIG. 7, output from the encoder 40 is represented as the actually measured value of rotating speed ωs, in fact the rotating speed of the electric motor is detected by the encoder 40, and then the detected speed is divided by a reduction ratio of the reduction gear 39 to obtain the rotating speed ωs.

Figure 14:
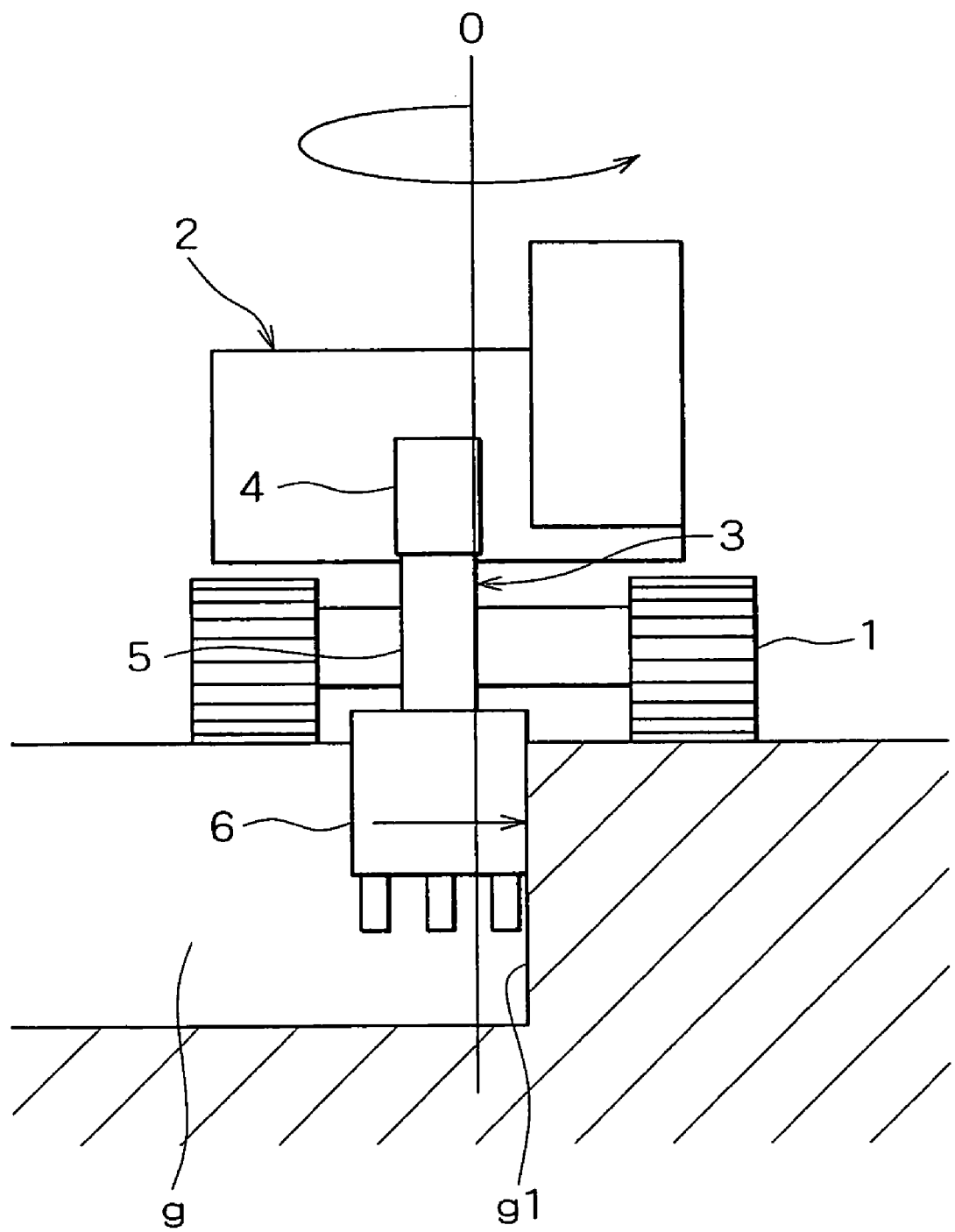
FIG. 14 is a front view showing a condition in which a bucket of the excavator is pressed against an inner wall surface of a groove.

On the other hands, when performing a pressing work as shown in FIG. 14, torque control is carried out.

Figure 9:
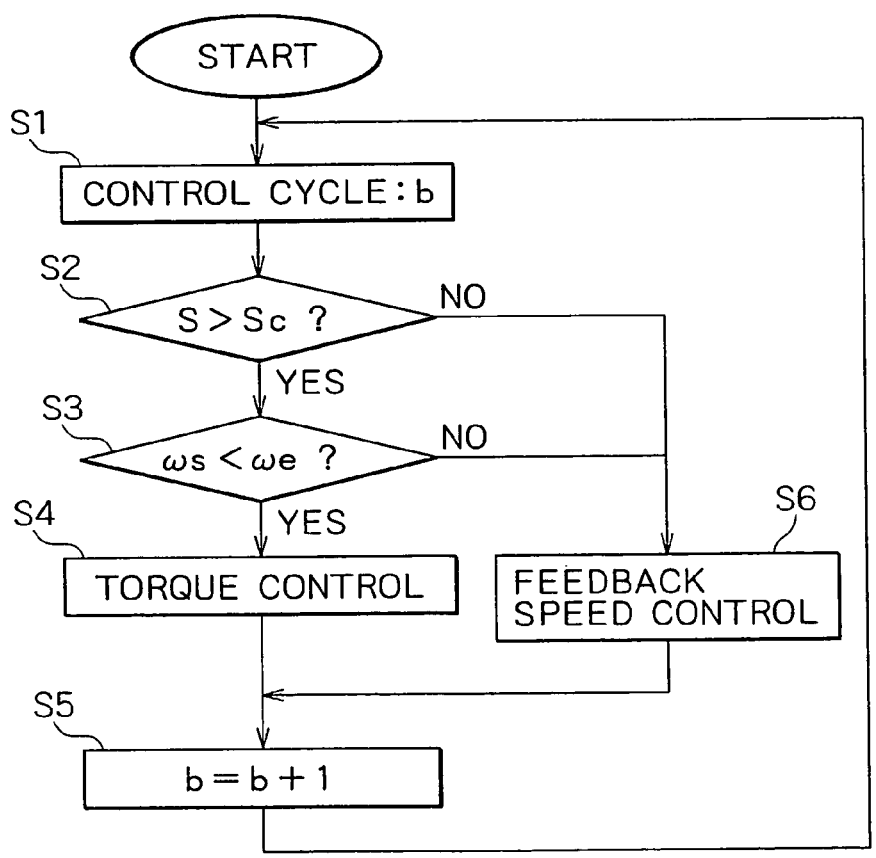
FIG. 9 is a flowchart for explaining an action of the device.

That is, the steps for determining the presence or absence of the pressing work are as follows. The lever operation amount S and a rotation starting point Sc are compared with each other every control cycle b as shown in FIG. 9 by the controller 33 (step S1, and S2). At the same time, the actually measured value of the rotating speed ωs and a threshold value ωe previously set as a minute value near zero as shown in FIG. 8 are compared with each other (step S3). When the lever operation amount S exceeds the rotation starting point Sc and the actually measured value of the rotating speed ωs is smaller than the threshold value ωe (Yes in steps S2 and S3), the condition of the pressing work is recognized, and then switchover to the torque control is automatically done (step S4). At a step S5, a control cycle b is updated, and the operation returns to the step 1. Note that, in the case of "NO" in the step S2 or S3 (S<Sc or ωs>ωe), the feedback speed control is carried out (step S6) as shown in FIGS. 7 and 8 (step S6) to bring about free rotation.

Note that, when an object to be subjected to the pressing work has irregularities or is made of a soft substance, the rotating speed often becomes above zero upon performing the pressing work. This renders determination of the pressing work as mentioned above unstable, causing hunting. In this case, there may be preferably provided hunting preventing mean for preventing hunting by decreasing feedback gains for the speed control or by giving a time-lag to the changeover of the above-mentioned determination.

Figure 10:
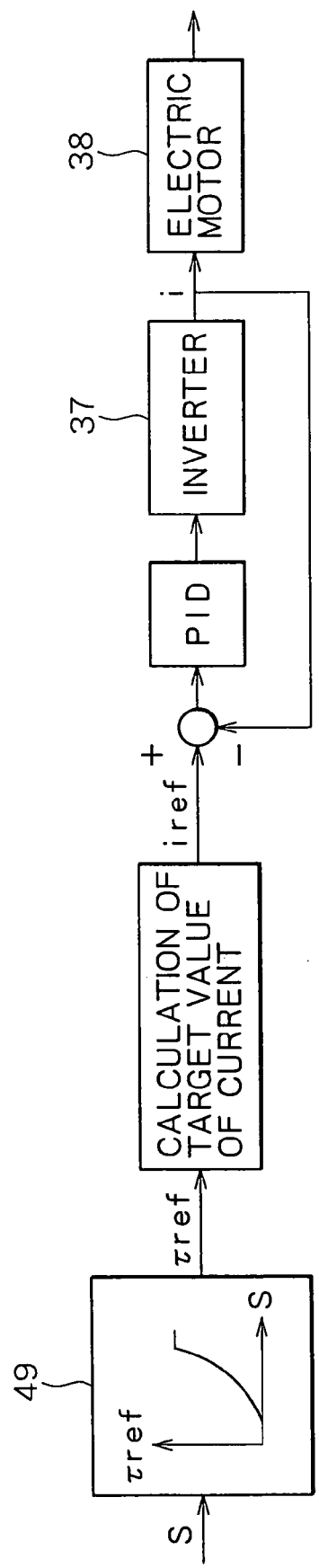
FIG. 10 is a flow diagram of torque control in the feedback control.
Figure 11:
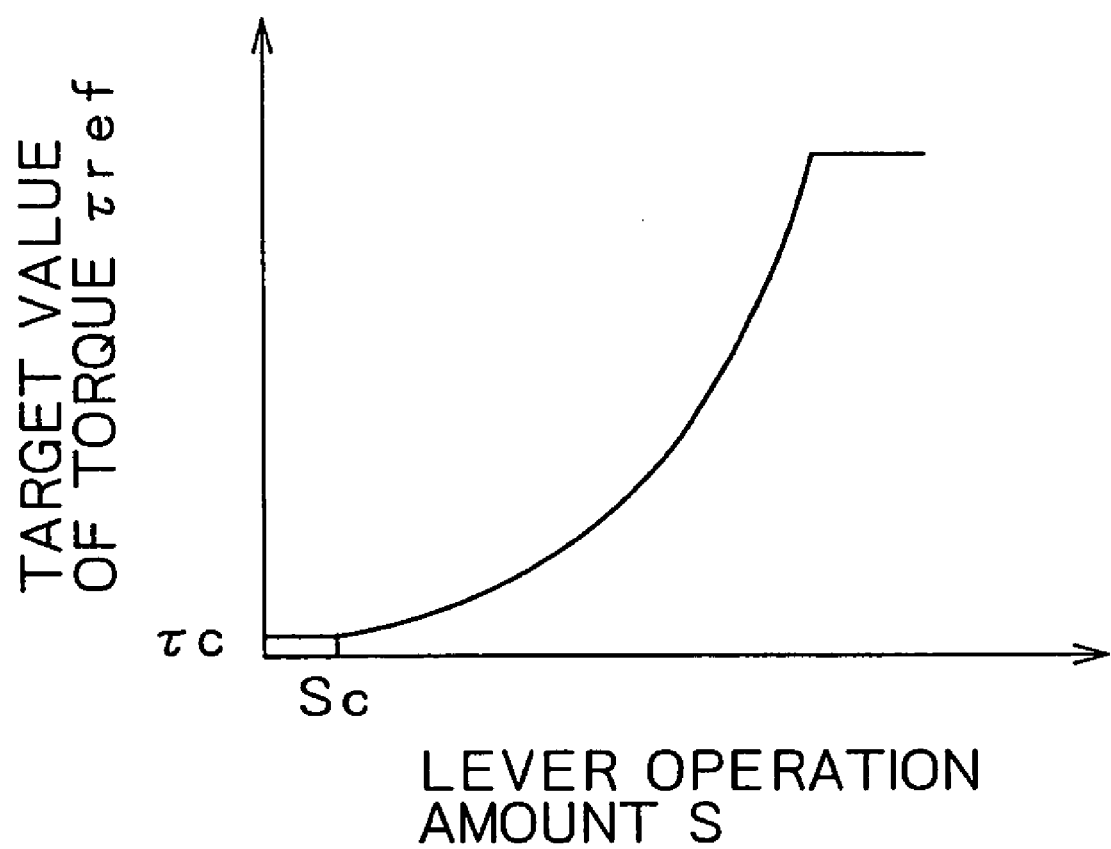
FIG. 11 shows a relationship between a lever operation amount and a target value of torque in the control.

In torque control, as shown in FIGS. 10 and 11, a target value torque τref as target value of torque is calculated from an operation amount-torque map 49 which sets a relationship between the lever operation amount S and the target torque value τref. This torque value calculated is converted into a target current value iref as a target value of current, so that the torque PID feedback control is carried out.

Thus, the presence of the pressing work is automatically recognized to perform the switchover to the torque control. By this torque control, the electric motor torque responsive to the lever operation amount S is obtained as shown in FIG. 11, whereby the pressing torque can be controlled according to operator's intention (the lever operation amount).

In this control system, when the lever 32a is pushed down from a lever neutral condition or position where its rotating speed is zero, to a position slightly deeper than a starting point of rotation Sc of FIG. 11, since the speed of the rotating body 2 is zero due to its inertial, the torque control is automatically started even when the body is in a freely rotating condition.

In this device, as shown in FIG. 11, the target torque value τref at the starting point Sc is set to a value τc larger than zero.

With this arrangement, at the starting point Sc, the rotation torque τc starts to work. Especially, as described above, when the lever 32a is moved to the deeper position than the starting point Sc, the rotation operation is promptly started, and the actual measured value of speed ωs reaches the target value ωre, which results in the switchover to the speed feedback control. This can improve speed controllability when starting the motion.

Figure 12:
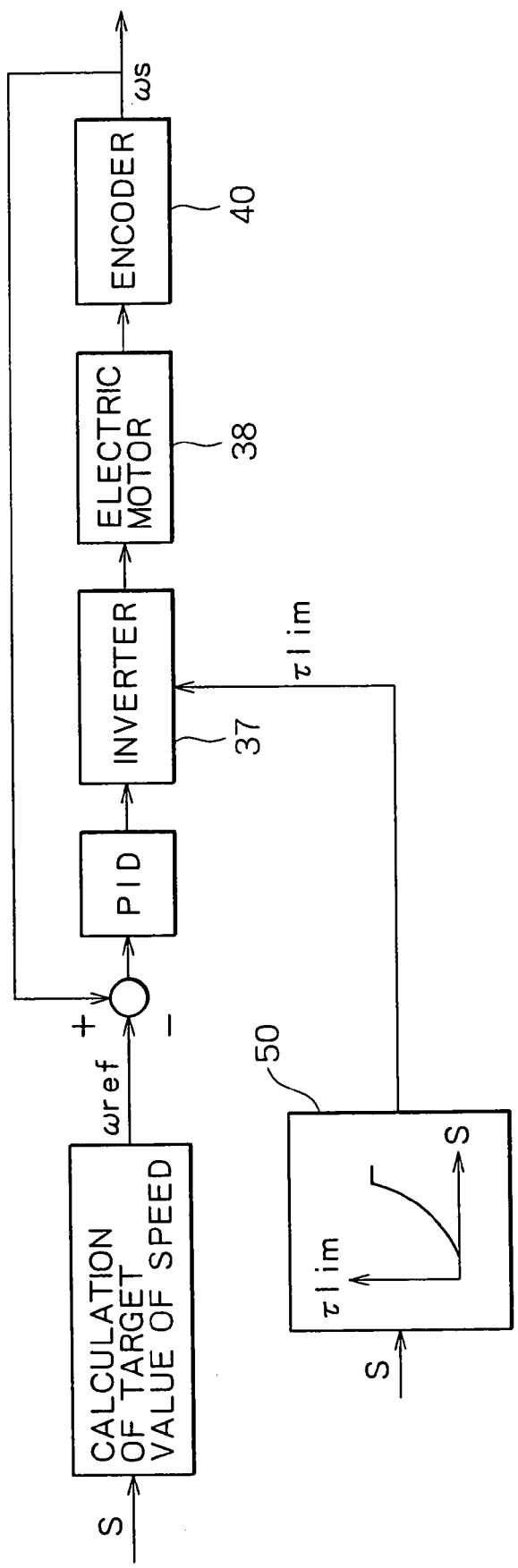
FIG. 12 is a flow diagram of speed control with a torque limitation performed by a control device according to a fourth embodiment of the present invention.
Figure 13:
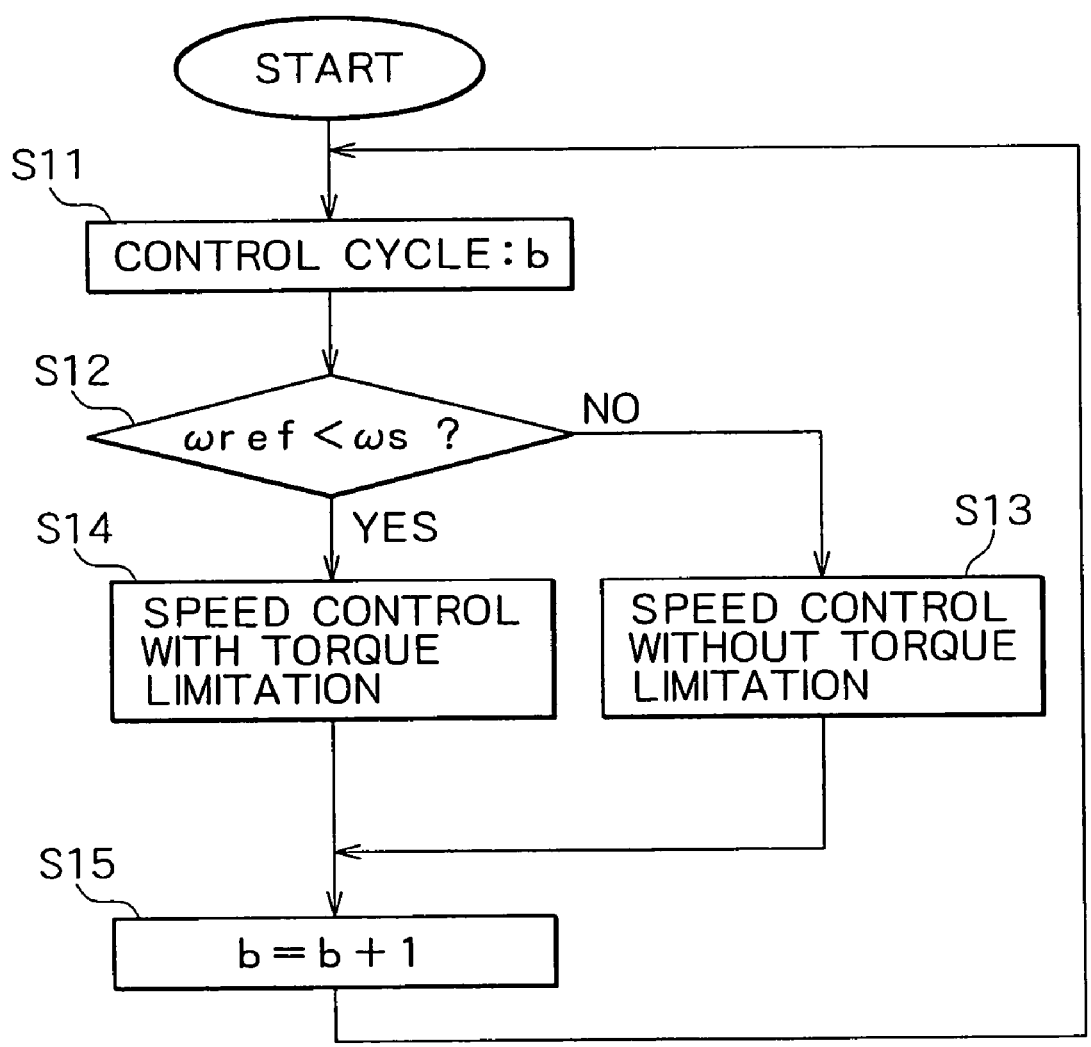
FIG. 13 is a flowchart for explaining an action of a control device according to a fifth embodiment of the present invention.

Fourth and Fifth Embodiments (See FIGS. 12 and 13)

The fourth and fifth embodiments are modifications of the third preferred embodiment. The different points from the third embodiment will only be described below.

In the fourth embodiment, in freely rotating, the speed feedback control according to the flowchart of FIG. 1 is carried out in the same manner as the third embodiment. In the pressing work, the control (speed control with torque limitation) is performed that imposes a torque limitation according to the lever operation amount S on the speed feedback control, based on the lever operation amount-torque limiting value map 50 preset, as shown in FIG. 12.

In the map 50 of FIG. 12, a sign τlim on a vertical axis is a torque limiting value.

Accordingly, the speed control with the torque limitation in the pressing work can provide the electric motor torque according to the lever operation amount in the same way as the torque control shown in FIGS. 10 and 11, thereby improving the operability when performing the pressing work as is the case with the third embodiment.

It should be noted that also in the fourth and next fifth embodiments, the torque limiting value τlim at the starting point Sc is set to a value τc larger than zero, thereby improving the speed controllability when starting the motion as is the case with the third embodiment.

In the preferred embodiment, as shown in FIG. 13, when the actually measured value of speed ωs is smaller than the target value ωref, this condition is recognized as the so-called powering condition, and then in this powering condition, the speed feedback control is switched to another speed feedback control with the torque limitation.

In detail, the target speed value ωref is compared with the actually measured one ωs every control cycle b (steps S11 and S12). If ωref≦ωs, the normal speed feedback control is carried out (step S13).

On the other hand, if ωref>ωs (YES in the step S12), the powering condition is recognized, and then the normal speed feedback control is automatically switched to another speed feedback control with the torque limitation as described in the fourth embodiment (see FIG. 12) (step S14). At a step S15, the control cycle b is updated to b+1 and the operation returns to the step S11.

Therefore, in the pressing work, which is one of powering conditions, the electric motor torque is controlled by the torque limitation effect as is the case with the fourth embodiment.

In this control system, even in accelerating of free rotation, the speed control effect with the torque limitation is exerted under the condition where the actually measured value of rotating speed ωs is smaller than the target value ωref. This restricts the acceleration of the body, thereby eliminating the shocks occurring upon accelerating.

Additionally, in deceleration, the torque limitation is not imposed. This enables deceleration at the maximum torque, especially emergency stop.

Therefore, in view of these aspects, the operability is improved.

Note that, although, in the third and fourth preferred embodiments, the pressing work is automatically recognized, thereby switching among the control systems, the invention is not limited thereto. For example, the operator may manually operate a switch in the pressing work so as to switch among the control systems.

INDUSTRIAL APPLICABILITY

As will be seen from the above descriptions, according to the present invention, when the rotating body is in the stopped state, the mechanical brake is actuated to hold the stopped body. The current to hold the body on the spot does not need to be constantly passed through the electric motor, which current might be necessary in the case of stopping and holding the body only by the position holding control, thereby achieving energy savings.

Additionally, in a boundary of the speed control range, the position holding control is carried out, thereby eliminating the risk of excessive wearing of the brake, which risk might occur in the case of decelerating and stopping the rotation only by the mechanical brake, while obtaining smooth accelerating and decelerating effect without shocks caused by the operation ON/OFF of the mechanical brake in the acceleration and deceleration of rotation, thus improving the operability of rotation.

Further, the on-the-spot holding torque generated when performing the position holding control in the neutral range is stored. The higher of the stored on-the-spot holding torque and the accelerating torque according to the operation amount of the operation means is set as the electric motor torque for acceleration when starting the rotation. With this arrangement, especially when the rotating body starts to rotate toward an upper end side of an inclined ground or when the rotating body starts to rotate upwind under strong wind, the risk of the retrograde motion of the rotating body is eliminated, thus resulting in improvement of the operability of the rotation.

Moreover, when performing the pressing work, instead of the speed control depending on the operation amount of the operation means, the torque control is carried out according to the operation amount, or control including the speed control with torque limitation imposed thereon is carried out. In the pressing work, the rotation torque is capable of being controlled through the use of the operation means according to the operator's intentions, thereby improving the operability in the pressing work.

The invention claimed is:

1. A rotation control device for a working machine, the device comprising:
    an electric motor for rotatably driving a rotating body;
    operation means for issuing a rotation command for rotation of the rotating body;
    control means for controlling said electric motor based on the rotation command issued from said operation means;
    a rotating speed detecting means for detecting a rotating speed of the rotating body; and
    a mechanical brake for generating mechanical braking force,
    wherein said control means has a neutral range set by adding a predetermined width to an absolute neutral point serving as a basic point, the absolute neutral point corresponding to an operation amount of said operation means of zero, and in said neutral range, a mechanical brake zone is set on the absolute neutral point side, while a position holding control zone is set on a side opposite to said neutral point side, and wherein said control means is adapted to cause said mechanical brake to work in the mechanical brake zone of said neutral range, to perform position holding control in said position holding control zone, thereby stopping and holding said rotating body, and to perform speed control according to the operation amount of said operation means outside the neutral range.

2. The rotation control device for the working machine according to claim 1, wherein a simultaneous use zone where the mechanical brake zone and the position holding control zone are partially superimposed on each other is set in the neutral range, and wherein said control means causes both functions of the mechanical brake and the position holding control to be carried out in the simultaneous use zone.

3. The rotation control device for the working machine according to claim 1, wherein, in decelerating rotation, when the operation amount of the operation means is within said position holding control zone and the rotating speed is equal to or less than a preset starting speed of a speed when the position holding control starts, said control means starts to perform the position holding control.

4. The rotation control device for the working machine according to claim 1, wherein, in decelerating rotation, when the operation amount of the operation means is within said mechanical brake zone and a condition in which the rotating speed is equal to or less than a preset brake operating speed continues for a set period of time, said control means actuates the mechanical brake.

5. A rotation control device for a working machine, the device comprising:
    an electric motor for rotatably driving a rotating body;
    operation means for issuing a rotation command for rotation of the rotating body;
    control means for controlling said electric motor based on the rotation command issued from said operation means; and
    a rotating speed detecting means for detecting a rotating speed of the rotating body, said control means performing speed control according to an operation amount of said operation means and imposing a limitation on a maximum value of accelerating torque according to said operation amount, wherein, when said operation means is positioned within a preset neutral range, said control means is adapted to perform position holding control of said rotating body, to store torque generated in said electric motor by the position holding control as on-the-spot holding torque, and to set, in accelerating the rotation, the higher of said on-the-spot holding torque stored and said accelerating torque produced according to the operation amount of said operation means, as electric motor torque for acceleration.

6. The rotation control device for the working machine according to claim 5, wherein, in decelerating the rotation, said control means calculates braking torque according to the operation amount of said operation means based on preset braking torque characteristics, and sets the higher of said calculated braking torque and said on-the-spot holding torque stored, as electric motor torque for deceleration.

7. The rotation control device for the working machine according to claim 5, wherein, when the operation means is returned within the neutral range and the position holding control is performed, said control means restores the on-the-spot holding torque stored to an initial value.

8. The rotation control device for the working machine according to claim 5, further including a mechanical brake for generating mechanical braking force, wherein, when the operation mean is positioned in a mechanical brake zone which is a part of the neutral range and includes an absolute neutral point, said control means actuates said mechanical brake.

9. A rotation control device for a working machine, the device comprising:
  an electric motor for rotatably driving a rotating body;
  operation means for issuing a rotation command for rotation of the rotating body;
  control means for controlling said electric motor based on the rotation command issued from said operation means; and
  rotating speed detecting means for detecting a rotating speed of the rotating body,
  said control means performing speed control to set a target value of the rotating speed of the rotating body according to an operation amount of said operation means when a pressing work is not being performed, wherein, when performing a pressing work including pressing a part of said rotating body against an object of work, said control means performs torque control with feedback control to provide a target value of the torque according to the operation amount of said operation means instead of said speed control.

10. The rotation control device for the working machine according to claim 9, wherein, in a condition the operation amount of said operation means is larger than an operation amount thereof at a starting position of the rotation and an actually measured value of the rotating speed is zero, or is equal to or less than a set value near zero, said control means judges the condition the pressing work.

11. The rotation control device for the working machine according to claim 9, wherein, under condition that the operation means is located at the starting position of the rotation, a target torque is set to be above zero.

12. The rotation control device for the working machine according to claim 10, wherein, under condition that the operation means is located at the starting position of the rotation, a target torque is set to be above zero.

13. A rotation control device for a working machine, the device comprising:
  an electric motor for rotatably driving a rotating body;
  operation means for issuing a rotation command for rotation of the rotating body;
  control means for controlling said electric motor based on the rotation command issued from said operation means; and
  a rotating speed detecting means for detecting a rotating speed of the rotating body,
  said control means performing speed control according to an operation amount of said operation means to set a target value of the rotating speed of the rotating body when a pressing work is not being performed, wherein, when performing a pressing work including pressing a part of said rotating body against an object of work, said control means performs speed control with control to impose a torque limitation according to the operation amount of the operation means on said speed control.

14. The rotation control device for the working machine according to claim 13, wherein, in a condition the operation amount of said operation means is larger than an operation amount thereof at a starting position of the rotation and an actually measured value of the rotating speed is zero, or is equal to or less than a set value near zero, said control means judges the condition the pressing work.

15. The rotation control device for the working machine according to claim 13, wherein, under condition that the operation means is located at the starting position of the rotation, a target torque is set to be above zero.

16. The rotation control device for the working machine according to claim 14, wherein, under condition that the operation means is located at the starting position of the rotation, a target is set to be above zero.

17. A rotation control device of a working machine, the device comprising:
  an electric motor for rotatably driving a rotating body;
  operation means for issuing a rotation command for rotation of the rotating body;
  control means for controlling said electric motor based on the rotation command issued from said operation means; and
  a rotating speed detecting means for detecting a rotating speed of the rotating body,
  said control means performing speed control according to an operation amount of said operation means to set a target value of the rotating speed of the rotating body when a pressing work is not being performed, wherein, when an actually measured value of the rotating speed is smaller than a target value corresponding to the operation amount of said operation means, said control means performs speed control with control to impose a torque limitation on said speed control.

18. The rotation control device for the working machine according to claim 17, wherein, under condition that the operation means is located at the starting position of the rotation, a target torque is set to be above zero.

* * * * *

UNITED STATES PATENT AND TRADEMARK OFFICE
CERTIFICATE OF CORRECTION

PATENT NO. : 7,067,999 B2 Page 1 of 1
APPLICATION NO. : 10/511602
DATED : June 27, 2006
INVENTOR(S) : Sugano et al.

It is certified that error appears in the above-identified patent and that said Letters Patent is hereby corrected as shown below:

On the title page, Item (73), the 2nd Assignee information is incorrect. Item (73) should read:

-- (73) Assignees: Kobelco Construction Machinery Co., Ltd., Hiroshima (JP); Kabushiki Kaisha Kobe Seiko Sho (Kobe Steel, Ltd.), Kobe (JP) --

Signed and Sealed this

Twenty-first Day of November, 2006

JON W. DUDAS
*Director of the United States Patent and Trademark Office*